United States Patent [19]

Ogata et al.

[11] Patent Number: 5,691,064
[45] Date of Patent: Nov. 25, 1997

[54] RELEASE FILM FOR PART WITH PRESSURE-SENSITIVE ADHESIVE ATTACHED

[75] Inventors: Kiyoshi Ogata, Sagamihara; Shinobu Sato, Itsukaichi-machi, both of Japan

[73] Assignee: Minnesota Mining and Manufacturing Company, St. Paul, Minn.

[21] Appl. No.: 617,748

[22] PCT Filed: Nov. 4, 1994

[86] PCT No.: PCT/US94/12664

§ 371 Date: Mar. 18, 1996

§ 102(e) Date: Mar. 18, 1996

[87] PCT Pub. No.: WO95/12642

PCT Pub. Date: May 11, 1995

[30] Foreign Application Priority Data

Nov. 4, 1993 [JP] Japan ................................. 5-275573

[51] Int. Cl.[6] ............................................ B32B 9/04
[52] U.S. Cl. ................. 428/411.1; 428/40.1; 428/53; 428/195; 428/339; 428/488.4; 428/500; 428/515
[58] Field of Search ................... 428/195, 411.1, 428/488.4, 500, 343, 355, 40.1, 53, 339, 515; 156/85, 60

[56] References Cited

U.S. PATENT DOCUMENTS 5,127,974  7/1992  Tomiyama et al. ................ 156/85
5,234,736  8/1993  Lee ................................... 428/42

FOREIGN PATENT DOCUMENTS 0 144 723  6/1985  European Pat. Off. .
WO 93/18072  9/1993  WIPO .

*Primary Examiner*—William Krynski
*Attorney, Agent, or Firm*—Gary L. Griswold; Walter N. Kirn; Scott A. Bardell

[57] ABSTRACT

A release film for a part with a pressure-sensitive adhesive attached to the part, in which the part with a pressure-sensitive adhesive attached has adequate adhesion to the release film within the temperature range from normal temperature to a low atmospheric temperature in the winter season is provided. A release film for a part with a pressure-sensitive adhesive attached to the part, which has a pressure-sensitive adhesive layer with a Tg value ranging from −50° C. to −20° C. and a thickness ranging from 3 μm to 50 μm, on a base material, is provided.

5 Claims, No Drawings

RELEASE FILM FOR PART WITH PRESSURE-SENSITIVE ADHESIVE ATTACHED

BACKGROUND OF THE INVENTION

The present invention relates to a release film used for moving a part with a pressure-sensitive adhesive attached to the part, and in particular, to a release film for a part with a pressure-sensitive adhesive attached to the part that can be used even in a low temperature atmosphere such as that in the winter season.

For installation of automobile parts, pressure-sensitive adhesive tapes have widely been used because of their cost, simplicity, and the like. These pressure-sensitive adhesive tapes are first attached to the parts to be installed and disposed by juxtaposition on the surface of a release film. To obtain a high adhesive strength, there have hitherto been used pressure-sensitive adhesives with a comparatively high Tg value, specifically, a Tg value of 0° C. or higher. Thus, the automobile parts with a pressure-sensitive adhesive and a release film attached are delivered to automobile manufacturing lines and the like. As the conventional release film used in the above cases or the like, there have been used or known the following release films.

In Japanese Unexamined Patent Publication (Kokai) No. 4-226184, there is disclosed a polyethylene film as a release film. Although this release film has the merit that it is available at a low cost, there has been the problem that its releasability is so high that automobile parts or the like have fallen off at times in an installation step for automobile parts and the like. In particular, there has been the problem that, in a low temperature atmosphere of 5° C. or lower in the winter season, the pressure-sensitive adhesive strength of pressure-sensitive adhesive tapes becomes lowered, which easily results in falling off of parts.

Japanese Unexamined Patent Publication (Kokai) No. 4-77557 discloses a silicone-treated polyester film. Although this film has the advantage that it is comparatively high in mechanical strength and excellent in dimensional stability, there has been caused the problem that owing to the too high releasability, automobile parts have fallen off during the installation process of automobile parts and the like, as in the case of the polyethylene film. This problem has been particularly serious in the winter season. In addition, owing to the wide scatter of the silicone-treatment, there have been caused troubles during the progress of work, or there has been observed the trouble that silicone proceeds into a pressure-sensitive adhesive tape, resulting in lowering of the pressure-sensitive adhesive strength of the pressure-sensitive adhesive tape, and so forth.

In addition, the following release films have been known. As a fluorine type release film, there have been known release films such as polytetrafluoroethylene (PTFE) and polyvinylidene fluoride. Although these release films are high in releasability, they are so expensive that it has been virtually impossible to use them as process films.

In addition, it has been impossible for these release films to retain an adequate adhesion in conformity with the circumstances such as temperature and the like, and there has been observed the problem that these release films are poor in mechanical strength and, therefore, inferior in processability and handling properties.

Polypropylene films have been known, but, although these films are high in releasability, it has been impossible for releasability to be varied according to the circumstances such as temperature, as in the case of PTFE and the like.

In addition, polyvinyl chloride films have been known, and these films have adequate flexibility and stretchability even at low temperatures, and have the merits that processing such as slitting or the like can easily be done, and that these films are available at a low cost. However, it has been impossible for a polyvinyl chloride film alone to retain an adequate adhesion according to the environmental circumstances such as ambient temperature, as in the case of the aforesaid films. There has also been the problem in a polyvinyl chloride film that a plasticizer contained in the polyvinyl chloride film migrates to the surfaces of the film, so that the pressure-sensitive adhesive strength of the pressure-sensitive adhesive tape becomes extremely lowered with time.

These conventional release films have not satisfied the following requirements which release films for parts with a pressure-sensitive adhesive attached to the part ought to have:

(1) that an adequate adhesion to the pressure-sensitive adhesive tapes attached to automobile parts or the like can be retained not only at normal temperature but even at low temperatures;

(2) that control of releasability is easy;

(3) that no adverse effect is exerted to the pressure-sensitive adhesive strength of a pressure-sensitive adhesive tape;

(4) that they are available at a low cost;

(5) that the mechanical strength of the film is high and the processability and handling properties thereof are excellent; and (6) that the film has adequate flexibility and stretchability even at low temperatures.

In addition, especially a pressure-sensitive adhesive tape with a high Tg value has been low in adhesion at low temperatures, and the conventional release films have not been able to be applied thereto.

Under these circumstances, the present invention is intended to provide a release film for a part with a pressure-sensitive adhesive attached, which satisfies all or most of the aforesaid requirements.

Various ways to provide a release film satisfying the aforesaid requirements were examined. Concisely, those requirements are that when a specific pressure-sensitive adhesive layer is provided on a base material, the adhesion of the boundary face between the surface of said specific pressure-sensitive adhesive and the surface of a pressure-sensitive adhesive tape adhered to the surface of a part scarcely depends upon the environmental temperature. The present invention provides a release film for a part with a pressure-sensitive adhesive attached to the part. The release film retains an adequate adhesion with a pressure-sensitive adhesive tape attached to automobile parts or the like, not only at normal temperature but even low temperatures.

SUMMARY OF THE INVENTION

Accordingly, the present invention provides a release film for a part with a pressure-sensitive adhesive attached to the part, which has a pressure-sensitive adhesive layer with a glass transition temperature (Tg) ranging from −50° C. to −20° C. and a thickness ranging from 3 to 50 μm on a base material. A copolymer of acrylic ester and vinyl acetate, especially an emulsion type one, is a preferred pressure-sensitive adhesive. In addition, as a base material, a vinyl chloride resin is preferred.

DETAILED DESCRIPTION OF THE PREFERRED EMBODIMENT

In the present invention, the adhesion value of the boundary face between the surface of the pressure-sensitive adhesive on the base material and the surface of the pressure-sensitive adhesive film attached to a part is within the range between 10 and 400 g/25 mm, preferably between 20 and 200 g/25 mm in a temperature atmosphere from 0° C. to 25° C., although this value depends upon the size or contact area of a part to be adhered.

When the adhesion is less than 10 g/25 mm, the probability is enhanced that the part with a pressure-sensitive adhesive attached to the part, which is adhered to the release film, will be dropped during the conveyance of the part. On the other hand, when the adhesion exceeds 400 g/25 mm, it becomes difficult to remove the part with a pressure-sensitive adhesive attached to the part from the release film. In addition, the reason an adhesion value ranging from 20 to 200 g/25 mm is preferable is that, within such a range, the value of adhesion is constant, and it becomes possible to remove a part with the pressure-sensitive adhesive attached to the part by an automatically operating machine.

In the following, the constituent elements of the present invention for obtaining the aforesaid adhesive strength will be explained.

Pressure-sensitive adhesive

In the present invention, it is essential for the Tg value of the pressure-sensitive adhesive to be within the range between −50° C. and −20° C. When the Tg value exceeds −20° C., the releasability is so light that the adhesion exerted between the pressure-sensitive adhesive and the release film becomes lowered, and there is a risk that automobile parts or the like may fall off in the installation process for automobile parts. On the other hand, when the Tg value is less than −50° C., there is caused the problem that the cohesive force of the pressure-sensitive adhesive becomes lowered, and dust is liable to be adhered, or the pressure-sensitive adhesive may be transferred to the pressure-sensitive adhesive side of the part.

In the present invention, a Tg value can be determined as a peak temperature of Tan δ in viscoelasticity measurement, measured by, e.g., "RSA-2" produced by Rheometric Co., Ltd.

Although the kind of pressure-sensitive adhesive is not particularly limited, a copolymer of acrylic ester and vinyl acetate is favorable. In addition, natural rubber, synthetic rubber and the like can be used within the Tg value range as defined in the present invention.

The reason acrylic ester is preferable as one component of the pressure-sensitive adhesive is that acrylic ester enables easy control of the Tg value of the pressure-sensitive adhesive, that it is available at a low cost, and that it can facilitate the control of the adhesion of the pressure-sensitive adhesive and the pressure-sensitive adhesive tape.

In addition, an acrylic pressure-sensitive adhesive has often been used as a pressure-sensitive adhesive of the pressure-sensitive adhesive tape at an automobile part side, and, astonishingly, an acrylic pressure-sensitive adhesive, acrylic ester of the same type as the acrylic pressure-sensitive adhesive exhibits excellent repeelability, so that a moderate adhesion can easily be obtained. That is, the temperature dependency of the adhesion exerted between a pressure-sensitive adhesive composed of acrylic ester and a pressure-sensitive adhesive tape is comparatively little, so that an adequate adhesion can be obtained at temperatures of 25° C. and 0° C., and in the installation stage of execution, there is no fear that automobile parts and the like may fall off at low temperatures.

In particular, a pressure-sensitive adhesive with an ester part with 4 to 9 carbon atoms has the advantage that its Tg value is comparatively lower and an adequate adhesion can be obtained. As concrete examples of acrylic ester, there may be mentioned isooctyl acrylate (IOA), isononyl acrylate (INA), 2-ethylhexyl acrylate (2EHA), n-butyl acrylate (nBA) and the like. In addition, in the present invention, as an acrylic monomer, acrylic acid or other acrylic monomers having a carboxyl group in the molecule should not be used. Because, if such a monomer is used, the carboxyl group causes a reaction with time and the adhesion is changed as the reaction proceeds.

Although the Tg value of a homopolymer of vinyl acetate is about 30° C., which is comparatively high, by converting the homopolymer into a copolymer of vinyl acetate and an acrylic ester, there can be obtained a pressure-sensitive adhesive having a Tg value within a Tg value range suitable for the present invention. In addition, vinyl acetate can impart to the pressure-sensitive adhesive a resistance to a vinyl chloride resin plasticizer when a vinyl chloride is used as a base material, or improve the cohesive force of the whole pressure-sensitive adhesive. On the contrary, in a pressure-sensitive adhesive composed of a homopolymer of an acrylic ester, when a vinyl chloride resin is used as a base material, there is a fear that the adhesion of the pressure-sensitive adhesive could be lowered with time because of a plasticizer for the vinyl chloride resin.

The weight ratio of the acrylic ester to the vinyl acetate is preferably within the range between 80:20 and 60:40 for causing the pressure-sensitive adhesive to exhibit a Tg value within the aforesaid range and an adequate adhesion, although this weight ratio is not particularly limited. When the proportion of acrylic ester in the above weight ratio exceeds 80, if a vinyl chloride resin is used for the base material, there is a fear that the cohesive force of the pressure-sensitive adhesive could be lowered with time because of a plasticizer, and, on the other hand, when the proportion of the acrylic ester is less than 60, the Tg value of the pressure-sensitive adhesive becomes increased, so that the adhesion of the pressure-sensitive adhesive becomes extremely lowered at low temperatures or the temperature dependency of the adhesion becomes increased.

The molecular weight of the copolymer of the acrylic ester and vinyl acetate is preferably 100,000 or more. If the molecular weight is less than 100,000, the cohesive force of the pressure-sensitive adhesive becomes low.

The polymerization can be carried out, e.g., by a solution polymerization, by radical polymerization, emulsion polymerization, or the like, although the polymerization process is not particularly limited. The emulsion polymerization is especially favorable for the following reasons. First, a copolymer pressure-sensitive adhesive obtained by emulsion polymerization has a high molecular weight, and a high cohesive force. Second, the pressure-sensitive adhesive is safe and available at a low cost. Third, the base material is not dissolved, because no solvent is used.

The pressure-sensitive adhesive of the present invention may be either uncrosslinked or crosslinked. The type of crosslinking agent is not particularly limited, and, e.g., isocyanate and the like may be used as a crosslinking agent.

In addition, an antioxidant, light absorber, filler and the like may be added to the present pressure-sensitive adhesive so long as the addition thereof does not depart from the purpose of the present invention.

The thickness of the present pressure-sensitive adhesive is favorably within the range between 5 and 30 μm. The reason therefor is that when the thickness is less than 5 μm, it is difficult to control the cohesive force of the pressure-sensitive adhesive, and there is a fear that the scatter of cohesive force should become high, and when a vinyl chloride resin is used as the base material, there is a fear that the adhesion of the pressure-sensitive adhesive tape could become lower with time. On the other hand, when the thickness of the pressure-sensitive adhesive exceeds 30 μm, it becomes difficult to control the cohesive force of the pressure-sensitive adhesive, resulting in a high scatter of the cohesive force distribution, and it becomes difficult to eliminate moisture and a solvent, in the case of the pressure-sensitive adhesive being coated.

Base material

The kind of the base material is determined by such factors as mechanical strength, processability, handling properties, cost and the like, although it is not particularly limited. A film of a polyvinyl chloride resin, polyethylene film, paper and the like is preferable.

In addition, although a polyvinyl chloride resin has the defect that it is inferior in solvent resistance, it is possible to eliminate this defect by providing a resin layer with solvent resistance on a polyvinyl chloride resin, using an aqueous solvent as the solvent for the specific pressure-sensitive adhesive to be provided on the base material, or by controlling the film thickness.

The thickness of the base material is preferably within the range between 25 μm and 250 μm, although it is not particularly limited. When the thickness of the base material is less than 25 μm, the base material becomes poor in mechanical strength, and on the other hand, when this thickness exceeds 250 μm, the cost of the base material becomes high or it becomes difficult to handle the base material.

To the base material of the present invention, there can be applied an embossing treatment, antistatic treatment and like, and the adherence between the base material and the pressure-sensitive adhesive can be enhanced by applying to the base material a primer such as rubber chloride when the base material is composed of polyvinyl chloride, or applying thereto a corona discharge treatment when the base material is composed of polyethylene.

The release film of the present invention has the characteristic features that it retains an adequate adhesion not only at normal temperature but at low temperatures, that the control of releasability is easy, that no adverse effect is exerted onto the adhesion of the pressure-sensitive adhesive tape, that it is available at a low cost, that its mechanical strength is high, that its processability and handling properties are excellent, that it has adequate flexibility and stretchability at low temperature, and so forth.

In the following, the present invention will be more concretely explained with reference to working examples.

EXAMPLE 1

A mixture consisting of 50 parts by weight of 2-ethylhexyl acrylate (2EHA), 20 parts by weight of n-butyl acrylate (BA), 30 parts by weight of vinyl acetate (VAc), 0.2 part by weight of an ammonium persulfate polymerization initiator, 3 parts by weight of sodium laurylsulfate emulsion, and 120 parts by weight of water, was emulsion polymerized in a nitrogen atmosphere for 4 hours at a temperature of 70° C., so as to obtain an aqueous emulsion pressure-sensitive adhesive (number-average molecular weight: about 1,500,000).

The thus obtained pressure-sensitive adhesive was coated on a transparent vinyl chloride sheet (PVC) with a thickness of 100 μm (on one surface of which an "SK Primer PR-5E" produced by Soken Kagaku K.K. had been coated as a primer in a dry weight proportion of 5 g/m$^2$) by a knife coater such that the thickness of the coating reached to a value of about 25 μm after the primer had been dried, and slitted to a width of 1 cm, so as to be formed as a release film for a part with a pressure-sensitive adhesive attached of the present invention.

Subsequently, an article made of polybutylene terephthalate, having a width of 20 mm, a length of 40 mm, and a thickness of 2 mm with a thermosetting type acrylic foam adhesive tape "#4775" produced by Sumitomo 3M K.K. was adhered onto such a release film by use of a 2 kg roll, whereafter the following evaluations were conducted by use of the article adhered to the release film as a sample for measurement.

In a measurement of adhesion, 180° peeling strengths of the tape were measured at atmospheric temperatures of 25° C. and 0° C., by use of a tensile tester, and the results were evaluated according to the following standards.

| Evaluation standards | |
| --- | --- |
| less than 10 g/25 mm | bad |
| 10 to 20 g/25 mm | good |
| 20 to 200 g/25 mm | best |
| 200 to 400 g/25 mm | good |
| higher than 400 g/25 mm | bad |

Part removing test:

After an article with the aforesaid pressure-sensitive adhesive tape adhered had been adhered to the release film, it was kept at a standstill for 24 hours at a temperature of 23° C. Then the part was manually peeled off from the release film, so as to conduct a test as to whether the part could easily be peeled off at the boundary face between the pressure-sensitive adhesive and the release film.

Evaluation standards good: The part could easily be peeled off from the boundary face between the pressure-sensitive adhesive tape and the release film.

bad: The part was peeled off from the boundary face between the pressure-sensitive adhesive tape and the part, and the pressure-sensitive adhesive attached to the release film was transferred to the pressure-sensitive adhesive tape.

Test as to whether the part is fallen off or not:

After the aforesaid part with the pressure-sensitive adhesive had been adhered to a release film and kept at a standstill for 24 hours at a temperature of 23° C., it was further kept at a standstill together with the release film for 3 hours in a thermostatic chamber, following which the part was caused to fall onto the floor from a height of 50 cm, so as to test whether or not the part was fallen off from the release film when it came into collision with the floor.

Evaluation standards no: The part was not fallen off, yes: The part was fallen off and scattered.

EXAMPLES 2 to 5

The same procedures as in Example 1 were conducted. However, as shown in Table 1, the type of the pressure-sensitive adhesive tape attached to the part and the monomeric composition of the pressure-sensitive adhesive, the thickness of the pressure-sensitive adhesive layer, and the type and thickness of the base material were varied, respectively. In Table 1, base material LDPE was a low density polyethylene film, to one side of which a corona discharge treatment had been applied.

The result are set forth in Table 1.

TABLE 1

EXAMPLES

| | Pressure-Sensitive Adhesive Tape For Part | | Release Film | | | | | Results | | | |
|---|---|---|---|---|---|---|---|---|---|---|---|
| | | | Pressure-Sensitive Adhesive | | | Base Material | | Peel Strength | | | |
| Ex. | Tape. | Tg (°C.) | Composition | Tg (°C.) | Thickness (μm) | Type | Thickness (μm) | 23° C. (g/25 mm) | 5° C. (g/25 mm) | Removal of Part | Falling off of Part |
| 1. | #4775 | 12 | 2EHA/BA/VAc 50/20/30 | −24 | 25 | PVC | 100 | 140 | 30 | good | no |
| 2. | #4775 | 12 | 2EHA/BA/VAc 50/20/30 | −24 | 15 | PVC | 100 | 90 | 25 | good | no |
| 3. | #4775 | 12 | 2EHA/BA/VAc 50/20/30 | −24 | 7 | LDPE | 150 | 40 | 15 | good | no |
| 4. | #4775 | 12 | 10A/BA/VAc 55/20/25 | −28 | 20 | LDPE | 150 | 140 | 30 | good | no |
| 5. | #4765 | 7 | INA/BA/VAc 50/20/30 | −24 | 20 | PVC | 150 | 90 | 35 | good | no |

All the release films satisfying the requirements of the present invention exhibited an adequate adhesion.

COMPARATIVE EXAMPLES 1 to 5

The same procedures as in Example 1 were conducted, with the exception that the Tg value of the pressure-sensitive adhesive and the thickness of the pressure-sensitive adhesive layer were set without the ranges as defined in the present invention, respectively. That is, in Comparative Examples 1 and 2, the thickness of the pressure-sensitive adhesive layer was without the range as defined in the present invention, and in Comparative Examples 3 to 5, the Tg value of the pressure-sensitive adhesive was without the range as defined in the present invention. In addition, the "BPS3757-1" in Comparative Example 5 is a synthetic rubber type pressure-sensitive adhesive produced by Toyo Ink Manufacturing Co., Ltd.

The results are set forth in Table 2.

TABLE 2

COMPARATIVE EXAMPLES

| | Pressure-Sensitive Adhesive Tape For Part | | Release Film | | | | | Results | | | |
|---|---|---|---|---|---|---|---|---|---|---|---|
| | | | Pressure-Sensitive Adhesive | | | Base Material | | Peel Strength | | | |
| Ex. | Tape. | Tg (°C.) | Composition | Tg (°C.) | Thickness (μm) | Type | Thickness (μm) | 23° C. (g/25 mm) | 5° C. (g/25 mm) | Removal of Part | Falling off of Part |
| 1. | #4775 | 12 | 2EHA/BA/VAc 50/20/30 | −24 | 3 | LDPE | 150 | 60 | 8 | good | yes |
| 2. | #4775 | 12 | 2EHA/BA/VAc 50/20/30 | −24 | 50 | LLDPE | 150 | 450 | 40 | bad | no |
| 3. | #4775 | 12 | 2EHA/VAc 50/50 | −5 | 25 | PVC | 100 | 60 | 5 or less | good | yes |

TABLE 2-continued

COMPARATIVE EXAMPLES

| Pressure-Sensitive Adhesive Tape For Part | | Release Film | | | | | Results | | | |
|---|---|---|---|---|---|---|---|---|---|---|
| | | Pressure-Sensitive Adhesive | | | Base Material | | Peel Strength | | | |
| Ex. | Tape. | Tg (°C.) | Composition | Tg (°C.) | Thickness (μm) | Type | Thickness (μm) | 23° C. (g/25 mm) | 5° C. (g/25 mm) | Removal of Part | Falling off of Part |
| 4. | #4775 | 12 | BM/MA/AA 60/30/10 | −5 | 20 | PVC | 100 | 500 | 5 or less | bad | yes |
| 5. | #4765 | 12 | rubber type pressure-sensitive adhesive BPS3757-1 | −55 | 20 | PVC | 100 | 600 | 60 | bad | no |

As may be clearly seen from Table 2, all the release films which did not satisfy the requirements of the present invention did not exhibit adequate adhesive properties. That is, in Comparative Examples 1 and 3, the adherability of the part was unstable or insufficient, and in Comparative Examples 2, 4, and 5, the adhesion value of the part at a temperature of 25° C. was too high to remove the part.

What we claim is:

1. A structure comprising (i) a part with a first pressure-sensitive adhesive attached to the part and (ii) a release film comprising a second pressure-sensitive adhesive on a base material, wherein said part and said release film are attached by their corresponding pressure-sensitive adhesive layers, wherein said pressure-sensitive adhesive layer on the base material has a Tg value ranging from −50° C. to −20° C. and a thickness ranging from 3 μm to 50 μm and wherein the adhesion value between the pressure-sensitive adhesive on the base material and the pressure-sensitive adhesive attached to the part is within the range between 10 and 400 g/25 mm.

2. The structure of claim 1, wherein said pressure-sensitive adhesive layer of said release film comprises a copolymer of an acrylic ester and a vinyl acetate monomer.

3. The structure of claims 2 or 1, wherein said pressure-sensitive adhesive layer of said release film is emulsion polymerized.

4. The structure of claims 2 or 1, wherein said base material or said release film comprises as a main component a polyvinyl chloride resin.

5. The structure of claims 2 or 1, wherein said pressure-sensitive adhesive layer of said release film has a thickness ranging from 5 μm to 30 μm.

* * * * *